US012125463B2

(12) United States Patent
Haselmann

(10) Patent No.: US 12,125,463 B2
(45) Date of Patent: Oct. 22, 2024

(54) INSTRUMENT CASE FOR STRING INSTRUMENTS

(71) Applicant: GEWA music GmbH, Adorf (DE)

(72) Inventor: Elias Haselmann, Trogen (DE)

(73) Assignee: GEWA music GmbH, Adorf (DE)

( * ) Notice: Subject to any disclaimer, the term of this patent is extended or adjusted under 35 U.S.C. 154(b) by 2 days.

(21) Appl. No.: 17/544,107

(22) Filed: Dec. 7, 2021

(65) Prior Publication Data

US 2022/0189442 A1 Jun. 16, 2022

(30) Foreign Application Priority Data

Dec. 14, 2020 (EP) .................................... 20213887

(51) Int. Cl.
*G10G 7/00* (2006.01)

(52) U.S. Cl.
CPC .................................... *G10G 7/005* (2013.01)

(58) Field of Classification Search
CPC ........... G10G 7/005; G10G 5/00; B65D 25/10
USPC .................................................... 206/314, 14
See application file for complete search history.

(56) References Cited

U.S. PATENT DOCUMENTS 361,817 A * 4/1887 Fiorini .................. G10G 7/005 206/14
2,156,910 A 5/1939 Brooks
4,190,152 A 2/1980 Reiter
4,531,632 A * 7/1985 Weber .................... A45C 13/02 984/259
7,290,653 B2 * 11/2007 Izen ....................... G10G 7/005 206/782
8,141,703 B2 * 3/2012 Sonoda .................. G10G 7/005 84/421
8,212,134 B2 * 7/2012 Kushner ................ G10G 7/005 84/453
2004/0154940 A1 * 8/2004 Minakuchi ............. A45C 11/24 206/314
2014/0131236 A1 * 5/2014 Kushner ................ A45C 13/36 206/314
2015/0034636 A1 * 2/2015 Aaland .................. B65D 25/10 220/660
2018/0215301 A1 * 8/2018 Smithson ........... A47G 23/0216
2018/0354711 A1 * 12/2018 Cheng ...................... B65D 9/18
2022/0154746 A1 * 5/2022 Farrar ....................... F16B 2/12

FOREIGN PATENT DOCUMENTS

DE 9203174 U1 8/1992

OTHER PUBLICATIONS

Extended European Search Report of May 27, 2021, issued in corresponding European Patent Application No. 20213887.1 (and English translation attached).
European Office Action mailed Aug. 22, 2023 in corresponding EP Patent Application No. 20 213 887.1 (and English translation).

* cited by examiner

*Primary Examiner* — Ernesto A Grano
*Assistant Examiner* — Symren K Sanghera
(74) *Attorney, Agent, or Firm* — Posz Law Group, PLC

(57) ABSTRACT

An instrument case for receiving a string instrument, has a housing, has a receiving region, delimited by the housing, for receiving an instrument and has at least one neck support module has a neck support unit for supporting an instrument neck,
wherein the neck support module has a bearing unit having two bearing elements and supporting the neck support unit in the receiving region in an adjustable manner.

20 Claims, 4 Drawing Sheets

INSTRUMENT CASE FOR STRING INSTRUMENTS

CROSS REFERENCE TO RELATED APPLICATION

Figure 1:
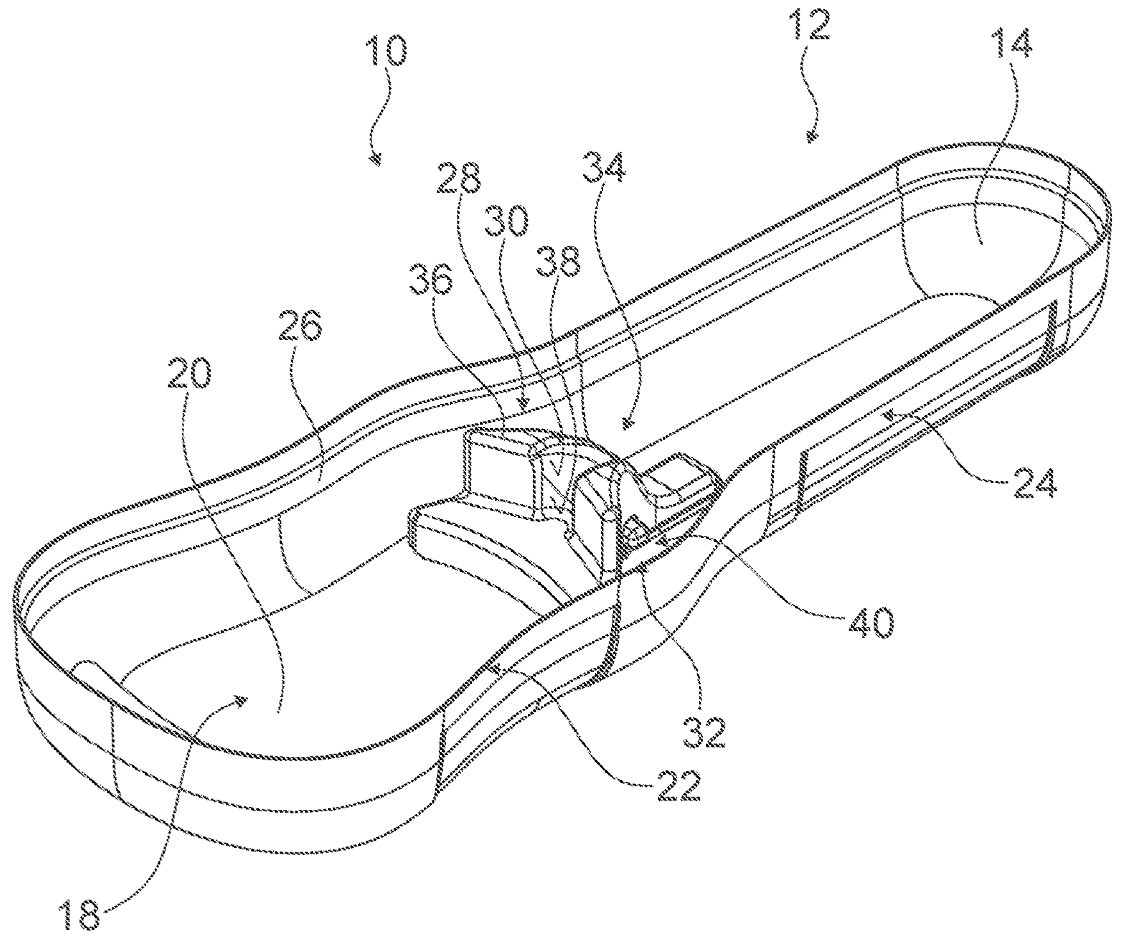

This application is based on and incorporates herein by reference European Patent Application Ser. No. 20/213,887.1 filed on Dec. 14, 2020.

STATE OF THE ART

The invention concerns an instrument case for string instruments.

An instrument case for receiving a string instrument, with at least one housing, with at least one receiving region, delimited by the housing, for receiving an instrument and with at least one neck support module comprising a neck support unit for supporting an instrument neck, has already been proposed.

The objective of the invention is in particular to provide a generic device having improved characteristics regarding flexibility and adjustability for different string instruments. The objective is achieved according to the invention by the features of patent claim 1 while advantageous implementations and further developments of the invention may be gathered from the subclaims.

ADVANTAGES OF THE INVENTION

The invention is based on an instrument case for receiving a string instrument, with a housing, with a receiving region, delimited by the housing, for receiving an instrument and with at least one neck support module comprising a neck support unit for supporting an instrument neck.

It is proposed that the neck support module comprises a bearing unit having two bearing elements and supporting the neck support unit in the receiving region in an adjustable manner. An "instrument case" is preferably to mean a case for storage and for secure transport of a string instrument, like for example a guitar, a violin, a cello, or another string instrument that is deemed expedient by someone skilled in the art. A "housing" is in particular to mean a protective outer casing of the instrument case. It is preferably to mean a unit that forms a rigid outer casing of the instrument case. By a "receiving region" is furthermore preferably a region to be understood which serves for an accommodation of objects, in particular of an instrument. It is preferably to mean a stowage space for an instrument. Preferentially the region is surrounded at least approximately completely by material units and/or elements of the instrument case, in particular by the housing, in at least one plane, preferably in a plane extending through a geometric center of the receiving region. Especially preferentially, starting from a geometric center of the receiving region, the receiving region is delimited by material units and/or elements of the instrument case, in particular by the housing, in at least four, preferably in at least five spatial directions. By a "neck support module" is preferably a module to be understood which is configured for a support of an instrument neck, like in particular a neck of a string instrument, for a secure support in the instrument case. The neck support module is preferably arranged firmly in the housing. Preferably, the neck support module is arranged in the housing in a loss-proof manner. Particularly preferentially, the neck support module is arranged in the housing in a non-destructively separable manner. Preferably the neck support module is mounted in the housing via a separable connection. The neck support module is arranged in the receiving region defined by the housing. The neck support module is preferably connected to a bottom of the housing. The neck support module preferably forms at least one neck support surface, which is configured such that an instrument, in particular a string instrument, can be supported and borne thereon with its neck at least in a partial region. The neck support surface herein preferably forms a concave contour corresponding at least substantially to a negative contour of an instrument neck. The neck support surface is preferably adapted to an instrument neck of a string instrument. The neck support surface is preferably adapted at least substantially to an instrument neck of a string instrument. Preferably the neck support surface is adapted to instrument necks of different string instruments, preferably of string instruments of different sizes. By a "neck support unit" is preferably in particular a unit to be understood which forms at least a portion of the neck support surface of the neck support module. Preferably the neck support unit comprises a neck support element which forms the entire neck support surface of the neck support module. Principally it is also conceivable that the neck support unit comprises several neck support elements, which in each case form a portion of the neck support surface. By a "bearing unit" is preferably a unit to be understood via which at least two elements are supported in such a way that they can be moved relative to each other. For this purpose, the bearing unit preferably comprises at least two bearing elements, which are preferably adjustable relative to each other. Principally it is also conceivable that the bearing unit comprises more than two bearing elements, for example three or four bearing elements. In this context it would be conceivable that one bearing element is supported so as to be adjustable relative to two further bearing elements, the two further bearing elements being fixed relative to each other. In the same way it is conceivable that all of the more than two bearing elements of the bearing unit are adjustable relative to one another. Preferably the bearing unit is configured to support the two elements, which are supported movably relative to each other, in such a way that they are movable relative to each other in at least one spatial direction. Preferably the bearing unit is in particular configured to support the neck support unit such that it is movable relative to the housing in a spatial plane. Principally it is also conceivable that the bearing unit is configured to support the neck support unit movably in a first spatial plane and additionally in a second spatial plane that is oriented perpendicularly to the first spatial plane. By a support in the two spatial planes, a longitudinal position and a height position of the neck support unit could be achieved. By "supported so as to be adjustable" is preferably to be understood that the neck support unit can be arranged in different positions relative to the housing. The neck support surface formed by the neck support module is thus arrangeable in the receiving region in different positions. In this way, the instrument case is especially easily adaptable to instruments of different sizes, in particular to different string instruments. In particular, the neck support module is advantageously adaptable to different instruments, in particular string instruments, such that the instrument neck can be optimally accommodated and supported, thus enabling especially secure transport and stowage.

It is furthermore proposed that the bearing unit is embodied as a linear bearing unit. By a "linear bearing unit" is preferably a bearing unit to be understood which is configured to traverse an element, like in particular the neck support unit, between at least two positions linearly, in particular along a bearing axis. For this purpose, a linear bearing unit comprises at least one stationary bearing rail and a bearing carriage that is displaceably guided therein. Preferably the bearing axis of the bearing unit is aligned in the longitudinal direction of the housing. Preferably, the bearing axis is aligned coaxially with a central axis of the housing which extends in the longitudinal direction of the housing. This allows an especially simple implementation of the bearing unit.

It is also proposed that the first bearing element of the bearing unit is embodied as a bearing rail and is firmly connected to the housing. By a "bearing rail" is preferably a linear bearing element to be understood which is configured to form a bearing path, preferably a straight bearing axis, along which a further element is linearly displaceable on or in the bearing rail. A bearing rail is configured such that a bearing carriage is connected thereto in a form-fit and/or force-fit manner, the bearing carriage having one degree of freedom relative to the bearing rail at least in one axis, in particular along the bearing axis. The bearing element which is embodied as a bearing rail preferably comprises at least one undercut. Particularly preferentially the bearing rail comprises two opposite-situated U-shaped subregions, which face each other and which in each case form an undercut. "Firmly connected to the housing" is preferably to mean that, at least in a mounted state, the bearing element is connected to the housing in a loss-proof manner. Preferably the bearing element that is embodied as a bearing rail is separably connected to the housing via a form-fit and/or force-fit connection. Especially preferentially the bearing element is firmly screwed with the housing via a screw connection by means of one or several screw/s. Principally it is as well conceivable that the bearing element that is embodied as a bearing rail is firmly connected to the housing by means of other form-fit and/or force-fit elements, for example via latch elements latching into latch recesses in the housing in a form-fit manner. Principally it would also be conceivable that the bearing element that is embodied as a bearing rail is realized integrally with the housing or is connected to the housing by substance-to-substance bond, e.g. via an adhesive connection, which is not separable without destruction. In this way the first bearing element can be implemented in a particularly simple manner and the neck support module is easily fixable with the housing via the bearing unit.

It is moreover proposed that the second bearing element of the bearing unit is embodied as a bearing carriage and is connected to the neck support unit. By a "bearing carriage" is preferably an element to be understood that is configured to be supported in an axially displaceable manner in a bearing element that is embodied as a bearing rail. The bearing element that is embodied as a bearing carriage preferably comprises a base body and at least one bearing region that is attached to the base body. The base body is configured for a connection of elements which are to be supported, like in particular the neck support unit. The neck support unit is connected, preferably directly connected, to the base body. The at least one bearing region is implemented by a web which is configured, for a support in the bearing element that is embodied as a bearing rail, to engage in a form-fit manner into the at least one undercut of the bearing element that is embodied as a bearing rail. Preferably, the bearing element that is embodied as a bearing carriage comprises two bearing regions implemented by webs, which are configured to engage into the two undercuts formed by the bearing element that is embodied as a bearing rail. The webs implementing the bearing regions preferably have an L-shape. This allows an especially advantageous and simple implementation of the second bearing element.

Beyond this it is proposed that the bearing unit comprises a blocking device, which is configured for a blocking of the bearing elements of the bearing unit in different positions. By a "blocking device" is preferably a device to be understood which, in at least one blocking position, prevents at least one movement of two elements relative to each other, in particular of the two bearing elements of the bearing unit relative to each other, by a form-fit and/or force-fit blocking of these elements relative to each other and, in a release position, releases a movement of the two elements relative to each other. By a "blocking in different positions" is preferably to be understood that the bearing elements can be blocked by the blocking device in different positions relative to each other. The blocking device may be configured such that it can be blocked in defined distance intervals. Principally it is also conceivable that the blocking device is configured so as to be blockable continuously, i.e. blockable in incrementally small distance intervals. "Configured" is in particular to mean specifically designed and/or equipped. By an object being configured for a certain function is in particular to be understood that the object fulfills and/or executes said certain function in at least one application state and/or operation state. This allows a particularly simple fixation of the neck support unit in different positions, and thus a simple fixed adjustment to differently sized string instruments.

It is also proposed that the blocking device comprises at least one first blocking element, which is connected to the first bearing element, and at least one second blocking element, which is connected to the second bearing element and is implemented correspondingly. By a "blocking element" is preferably a form-fit and/or force-fit element to be understood which brings the blocking device into a blocking position by a form-fit and/or force-fit connection to a blocking element that is implemented correspondingly. A blocking element that is implemented as a form-fit element is preferably embodied as a tooth element having at least two or more teeth, which are configured for a form-fit blocking of the blocking device. A blocking element that is implemented as a force-fit element is preferably embodied as a friction element having at least one friction surface that is configured, for a blocking of the blocking device, to enter a friction-fit connection with a friction surface that is embodied correspondingly. Preferably, a blocking element that is implemented as a force-fit element is pressed into a blocking position by means of a spring element in order to generate a contact force between the blocking element that is implemented as a force-fit element and the correspondingly embodied friction element. This allows a particularly simple implementation of the blocking device.

Moreover, it is proposed that the first blocking element comprises a toothing and the second blocking element comprises a corresponding toothing, which engage into each other in a form-fit manner for blocking. A "toothing" is preferably to mean a plurality of teeth arranged in a row of teeth, Preferably all the teeth of the toothing are implemented identically. A "corresponding toothing" is preferably to mean a toothing with at least one tooth, preferably a plurality of teeth, which is/are implemented in such a way that it/they are capable of engaging into the teeth of the correspondingly implemented toothing in a form-fit manner. In this way, the blocking elements of the blocking device can be implemented in a particularly simple fashion and a secure blocking via the blocking device can be ensured.

It is further proposed that the blocking device comprises a spring element, which is configured to press the first and second blocking elements into a blocking position. By a "spring element" is in particular an elastic element to be understood that has at least one extension and/or a number of windings which is in a normal operation state elastically modifiable by at least 10%, in particular by at least 20%, preferably by at least 30% and especially advantageously by at least 50%, and which in particular generates a counterforce, said counterforce depending on a change of the extension and/or of the number of windings and being preferably proportional to the change and acting counter to the change. The spring element is preferably embodied as a compression spring element. The spring element is preferably embodied as a helical spring. Principally it would also be conceivable that the spring element is implemented in a different fashion deemed expedient by someone skilled in the art, for example as a disk spring. In this way a simple, automatic blocking of the blocking device is achievable.

Furthermore, it is proposed that the blocking device comprises an actuation mechanism, by means of which the blocking device is manually adjustable between a blocking position and a release position. By an "actuation mechanism" is preferably a mechanism to be understood, which is configured to be actuated by an operator and to transfer an actuation movement onto the at least one blocking element of the blocking device, in order to adjust the at least one blocking element between its blocking position and its release position. Preferably, the at least one blocking element of the blocking device can be brought from its blocking position into its release position by means of the actuation mechanism via the manual adjustment. An adjustment of the blocking element from the release position into the blocking position is preferably effected automatically. A "manual adjustment" is preferably to mean an adjustment by an operator, for example by an exertion of a pressure force onto an actuation member. Principally it would also be conceivable that a manual exertion of a pull force is provided for an actuation of the actuation mechanism. As a result, the blocking device is operable in a particularly simple manner, and thus an adjustment of the neck support module is enabled in a particularly simple manner.

It is moreover proposed that the actuation mechanism comprises at least one actuation member, which is connected to the at least one second blocking element, and a spring element, against whose spring force the actuation member is deflectable. By an "actuation member" is preferably an element to be understood that can be deflected by an operator between a neutral position and an actuation position via a force effect. Preferably the actuation member is embodied as a spring-loaded push button, which is deflectable from its neutral position into its actuation position by application of a pressure force. Principally it would also be conceivable that the actuation member is implemented as a pull element, which is deflectable from its neutral position into its actuation position by application of a pull force. Principally it would as well be conceivable that the actuation member is implemented as a rotary element, which is rotatable from its neutral position into its actuation position by application of a torque. This allows a particularly simple implementation of the actuation mechanism for the actuation of the blocking device, Beyond this it is proposed that the spring element of the blocking device and the spring element of the actuation mechanism are implemented integrally with each other. "Integrally" is in particular to mean at least by substance-to-substance bond, for example by a welding process, a gluing process, an injection-molding process and/or another process deemed expedient by someone skilled in the art, and/or advantageously formed in one piece, like for example by a production from a cast and/or by a production in a one-component or multi-component injection molding procedure, and advantageously from a single blank. Preferably the spring element of the blocking device and the spring element of the actuation mechanism are realized by the same spring element. This allows an especially advantageous implementation of the blocking device and of the actuation mechanism, and in particular an especially advantageous implementation of the neck support module with a small number of components.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features individually and will find further expedient combinations.

Figure 2:
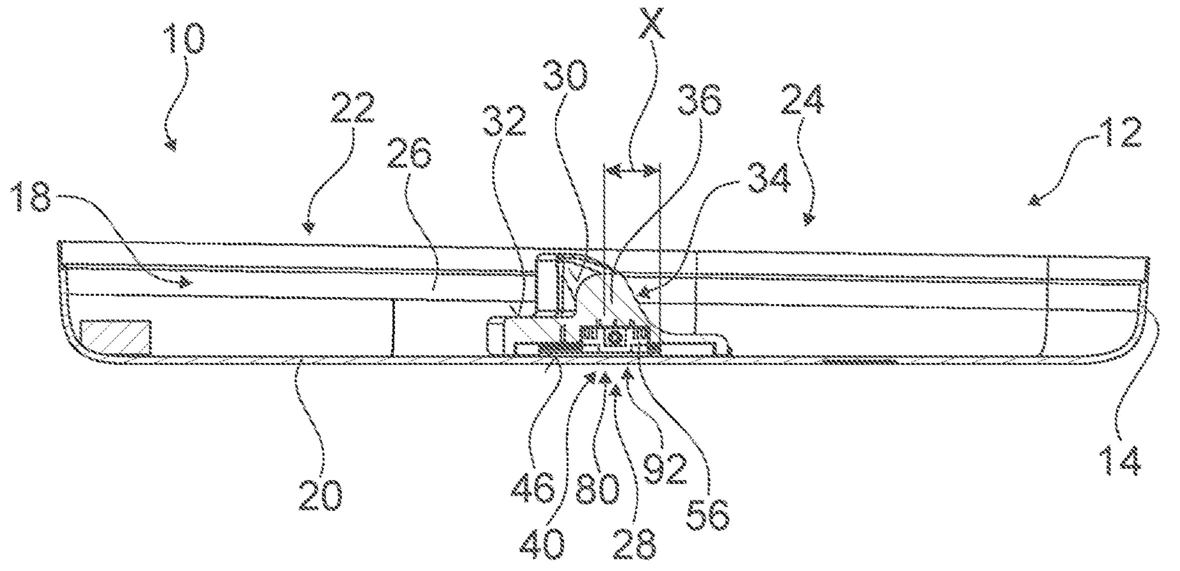
Figure 3:
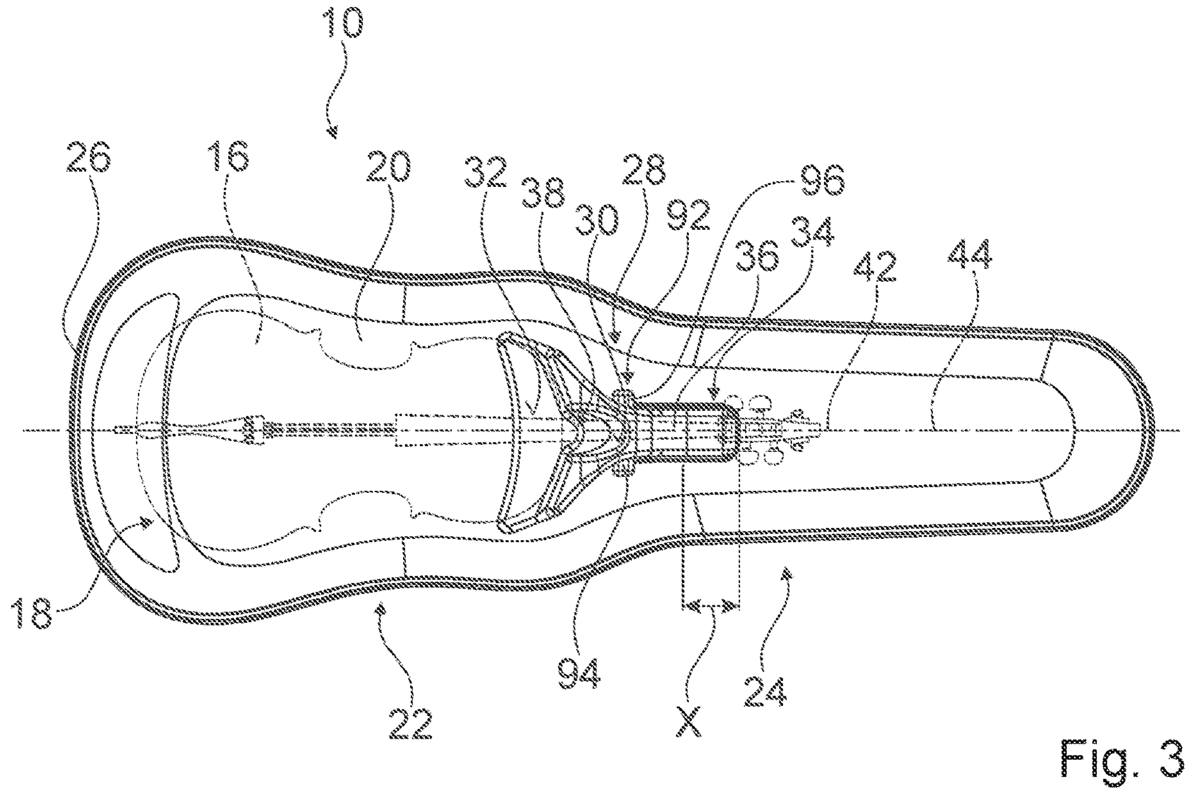
Figure 4:
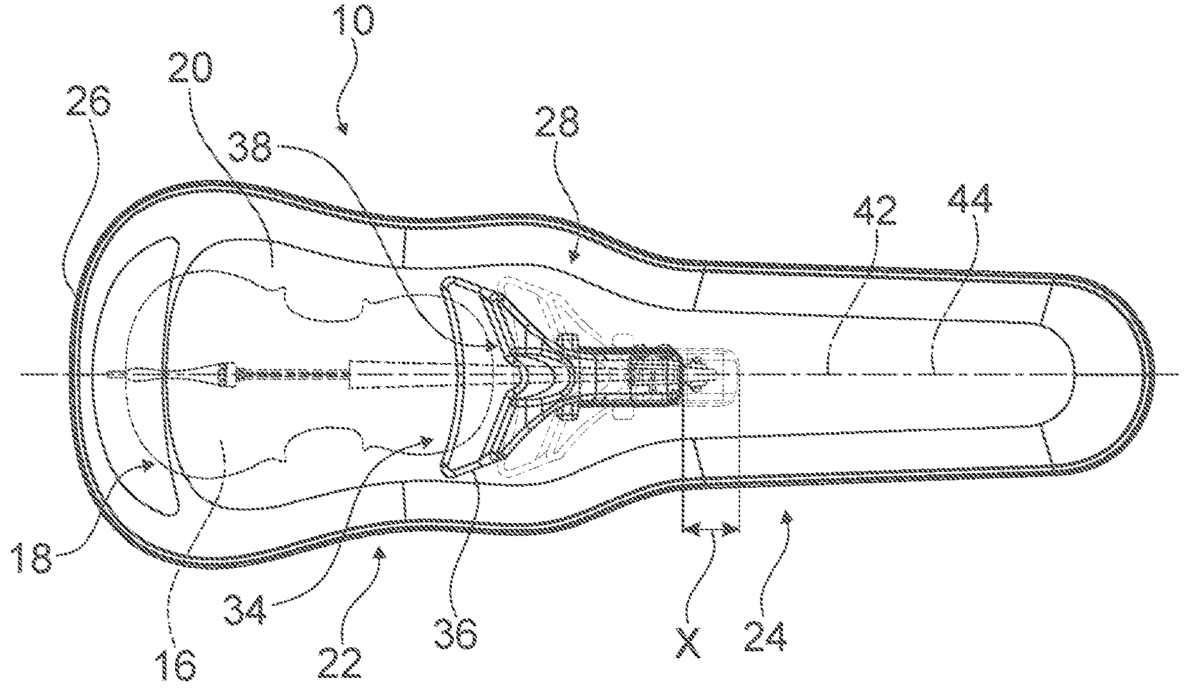
Figure 5:
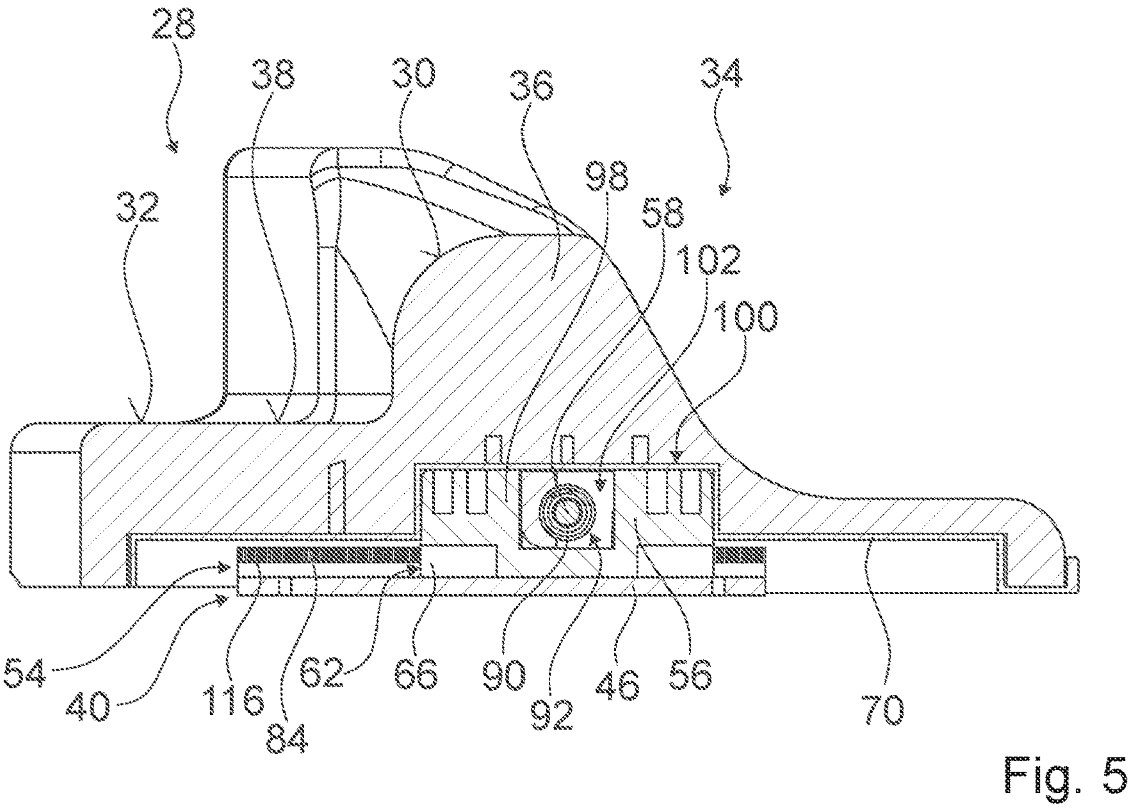
Figure 6:
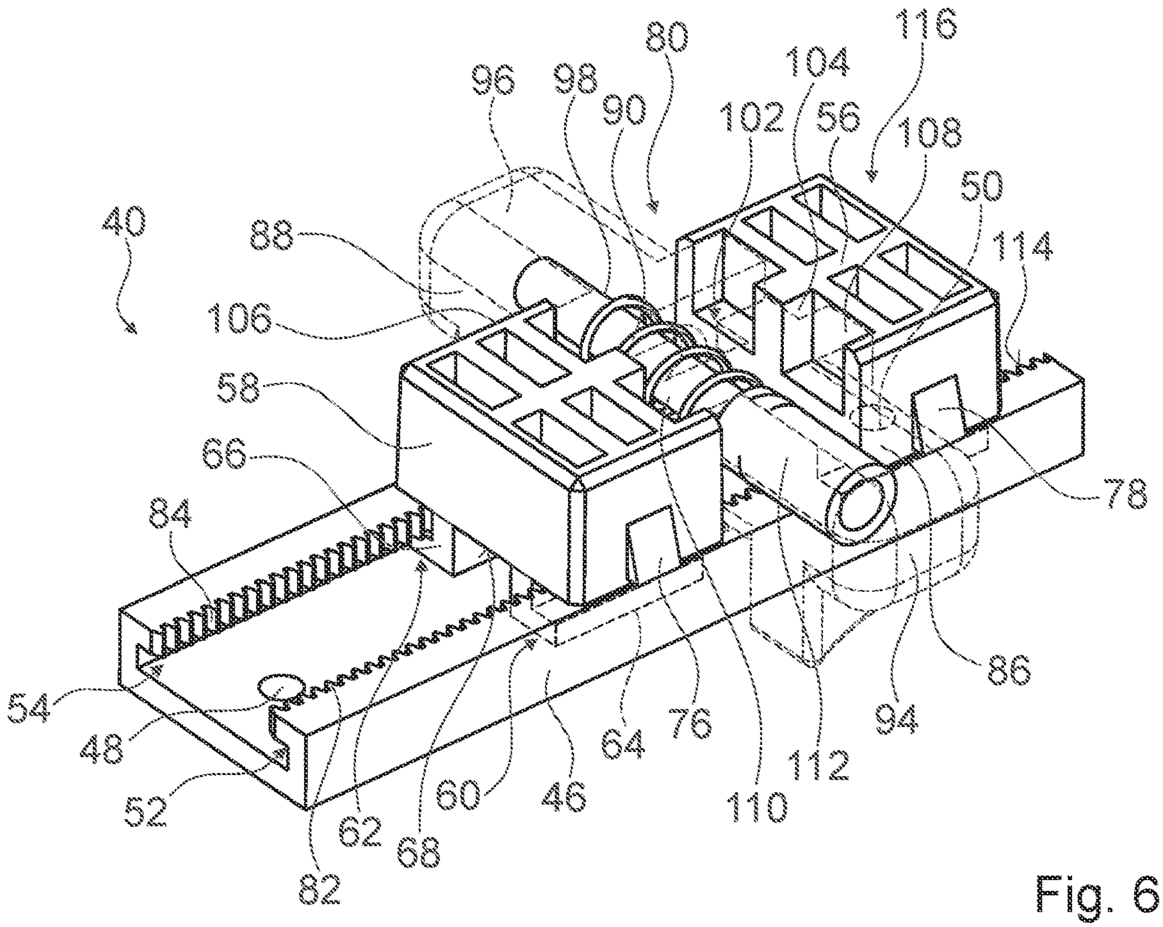
Figure 7:
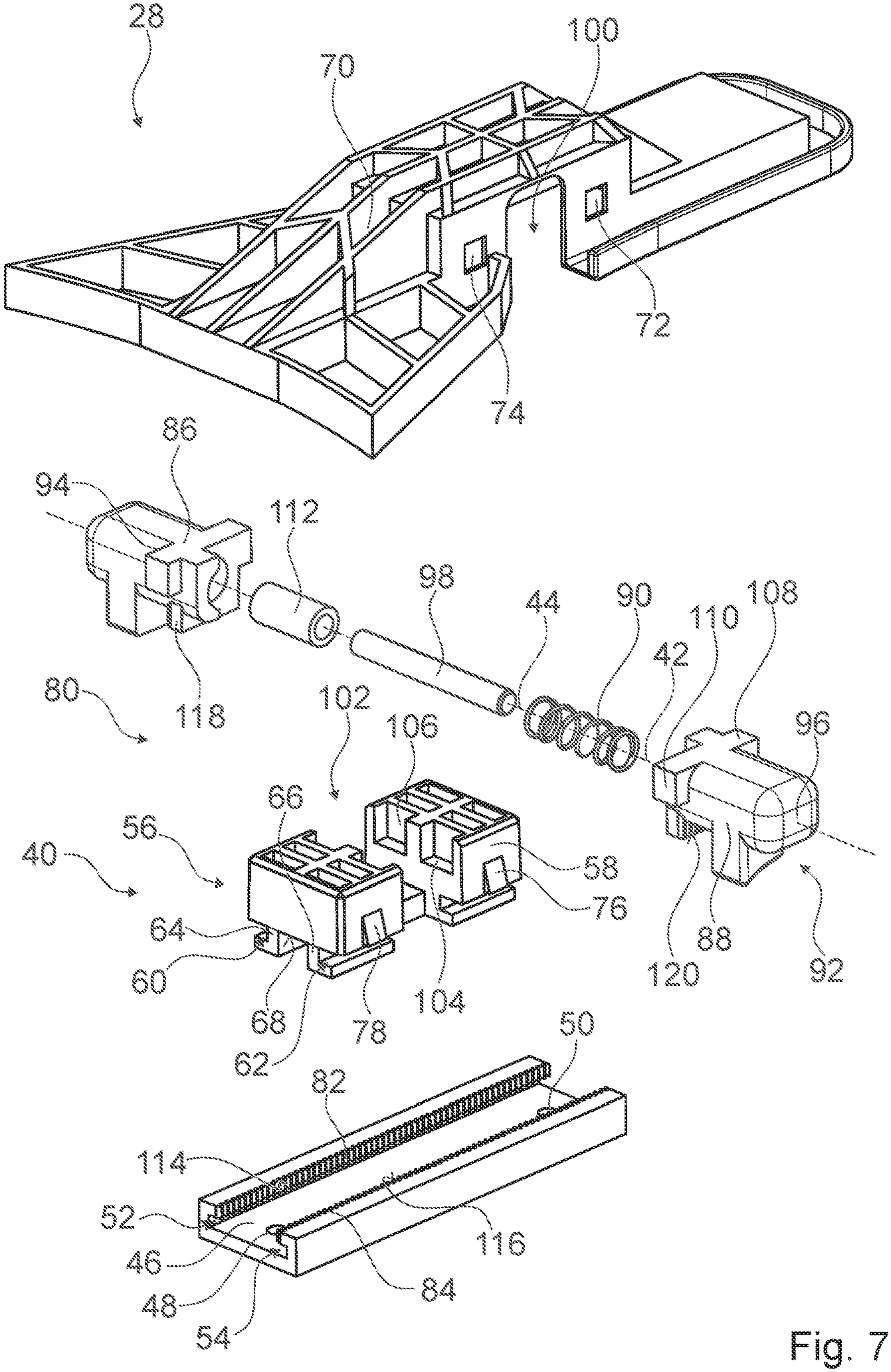

It is Shown in:

FIG. 1 a schematic view of an instrument case according to the invention in a first exemplary embodiment, with a neck support module, FIG. 2 a schematic sectional view through a central axis of a housing of the instrument case, FIG. 3 a schematic top view onto the instrument case with a neck support unit of the neck support module in a maximum position, FIG. 4 a schematic top view onto the instrument case with a neck support unit of the neck support module in a minimum position, FIG. 5 a schematic sectional view of the neck support module through the central axis, FIG. 6 a schematic view of a bearing unit, a blocking device and an actuation mechanism of the neck support module, and FIG. 7 a schematic exploded view of the bearing unit and the actuation mechanism of the neck support module.

DESCRIPTION OF THE EXEMPLARY EMBODIMENT

FIGS. 1 to 7 show an exemplary embodiment of an instrument case 10 according to the invention. The instrument case 10 is realized by a guitar case. However, principally a different implementation of the instrument case 10, deemed expedient by someone skilled in the art, would also be conceivable, for example as a violin case, a viola case, or as a cello case or contrabass case. The instrument case 10 is configured for receiving a string instrument. The instrument case 10 comprises a housing 12. The housing 12 is realized by a shell housing. The housing 12 comprises two housing shells 14. The first housing shell 14 is embodied as a housing base body. The second housing shell, which is not shown in detail, is embodied as a lid. The first, lower housing shell 14 is configured to directly accommodate an instrument 16, wherein the lid, which is not shown in detail, is configured for closing the housing 12. The lid may be connected to the first housing shell 14 of the housing 12 via clamp closures (not visible). The instrument case 10 further comprises a receiving region 18, which is limited by the housing 12. The receiving region 18 is configured to accommodate an instrument 16. The instrument 16 is a string instrument. By way of example, the instrument 16 is here depicted as a violin. However, a different implementation of the instrument 16, deemed expedient by someone skilled in the art, would also be conceivable, like for example as a guitar, as a cello, as a viola or as a contrabass. The receiving region 18 is delimited by the first housing shell 14 and by the lid (not shown in detail) of the housing 12, In a closed state of the housing 12, the receiving region 18 is essentially closed. A shape of the housing 12, i.e, a shape of the housing shells 14, is adapted to a general shape of the instrument 16. An outer contour of the housing shells 14 roughly corresponds to a shape of the instrument 16. The housing 12 comprises a body region 22, in which a body of the string instrument 16 can be arranged. The housing 12 comprises a neck region 24, in which an instrument neck of the string instrument 16 can be arranged. The housing comprises a central axis 44. The central axis 44 is realized as a longitudinal axis of the housing 12. The central axis 44 preferably forms a reflection axis of the housing 12.

The housing shell 14 of the housing 12 comprises a base side 20. The base side 20 of the first housing shell 14 is implemented as a bottom. The base side 20 of the housing shell 14 is essentially planar. A shape of the base side 20 roughly corresponds to a two-dimensional contour of the instrument 16. In an accommodated state of the instrument 16, a bottom of the body of the instrument 16 faces toward the base side 20. In a peripheral region of the base side 20, a circumferential side wall 26 of the housing shell 14 adjoins the base side 20. The side wall 26 extends substantially perpendicularly to the base side 20. In an accommodated state of the instrument 16, a rib of the body of the instrument 16 faces toward the side wall 26. The rib of the instrument 16 extends substantially parallel to the side wall 26. In an accommodated state, the instrument 16 is surrounded by the housing shell 14. In an accommodated state, the instrument 16 is surrounded completely by the housing shell 14 in a plane that is parallel to the bottom of the body of the instrument 16. In an accommodated state, a side of the instrument 16 that forms a cover of the body of the instrument 16 is covered by the housing shell 14 of the housing 12 that is implemented as a cover and is not shown in detail. The body constitutes a resonating body, i, e, the sound box, of the instrument 16. The rib means those components of the body of the instrument 16 which form the side wall, respectively side walls, of the instrument 16.

The instrument case 10 comprises a neck support module 28 for a support of an instrument neck of the instrument 16 that is accommodated in the receiving region 18. The neck support module 28 is preferably configured to support a lower region of the instrument neck of the accommodated instrument 16. The lower region of the instrument neck is a region facing toward the body of the instrument 16. The neck support module 28 is also configured to support an upper region of the body of the instrument 16. The neck support module 28 is configured to support the instrument 16 in a transition region between the body and the instrument neck. The neck support module 28 is configured to provide a support surface 30, which the instrument 16 can be laid upon with its instrument neck. The neck support module 28 is configured to provide a support surface 32, which the instrument 16 can be laid upon with an upper region of its body. The neck support module 28 is configured for a positionally secure support of the instrument 16 in the receiving region 18 of the housing 12. The neck support module 28 is preferably configured to securely support the instrument 16 in the receiving region 18 of the housing 12. The neck support module 28 is configured for a positionally stable support of the instrument 16 in the receiving region 18 of the housing 12. The neck support module 28 is configured to sustain the instrument neck of the instrument 16 in the receiving region 18. Positionally stable and tilt-free support of a string instrument 16 in the receiving region 18 is enabled by the neck support module 28. Due to the neck support module 28, the string instrument 16 supported in the receiving region 18 can planarly lie upon the base side 20 of the housing 12 with the bottom of its body, and the instrument neck can be sustained at a distance from the base side 20 and can thus be supported securely.

For supporting the instrument neck, the neck support module 28 comprises a neck support unit 34. The neck support unit 34 is configured to provide the support surfaces 30, 32 for the instrument neck and for the upper region of the body of the instrument 16. The neck support unit 34 comprises a neck support element 36. The neck support element 36 comprises a support zone 38, which forms the two support surfaces 30, 32 for the instrument neck and for the upper region of the body of the instrument 16. The neck support element 36 is preferably implemented correspondingly to an underside of the instrument 16 in the transition region between the body and the instrument neck. Principally it would also be conceivable that the neck support unit 34 comprises several neck support elements, which in each case form a portion of the support surfaces 30, 32 for the instrument neck and for the upper region of the body of the instrument 16. These several neck support elements could then be adjustable relative to one another, thus allowing an adaption of the support surface formed by the neck support unit 34 to instruments 16 of different sizes.

The neck support module 28 comprises a bearing unit 40. The bearing unit 40 is configured to adjustably support the neck support unit 34 in the receiving region 18. The bearing unit 40 is in particular configured to support the neck support element 36 of the neck support unit 34 movably in the receiving region 18. The bearing unit 40 is in particular configured for an adaption of the neck support unit 34 to instruments 16 of different sizes. By the bearing unit 40, the support surfaces 30, 32 formed by the neck support unit 34 can be changed in their relative positions in the receiving region 18 of the housing 12. The bearing unit 40 is preferably configured to support the neck support element 36 adjustably in a plane extending parallel to the base side 20 of the housing 12. The bearing unit 40 is in particular configured to support the neck support element 36 movably along a displacement path.

The bearing unit 40 is embodied as a linear bearing unit. The bearing unit 40 that is embodied as a linear bearing unit is configured to support the neck support unit 34 displaceably along a bearing axis 42. The bearing axis 42 of the bearing unit 40 that is embodied as a linear bearing unit is preferably aligned parallel to the central axis 44 of the housing 12. The bearing unit 40 is configured to support the neck support unit 34 in such a way that it is linearly displaceable along the bearing axis 42, i.e. along the central axis 44 of the housing 12. The neck support unit 34 is linearly displaceable by means of the bearing unit 40 along the bearing axis 42, i.e. along the central axis 42 of the housing 12. The bearing unit 40 is configured to support the neck support unit 34 at a bearing distance X. The bearing distance X is preferably 5 cm to 10 cm. Principally it is also conceivable that the bearing distance has a larger or smaller value, depending on the differences in the sizes of the instruments 16 which are to be accommodated. The bearing unit 40 is configured to adjust the neck support unit 34 between a minimum position and a maximum position. For an adjustment of the neck support unit 34 between a minimum position and a maximum position, the bearing unit 40 is configured to adjust the neck support unit 34 by the bearing distance X.

The bearing unit 40 comprises a first bearing element 46. The first bearing element 46 is firmly connected to the housing 12. For a firm connection to the housing 12, the first bearing element 46 is firmly coupled with the base side 20 of the housing 12. The first bearing element 46 is connected to the base side 20 of the housing 12 via a form-fit connection in a loss-proof manner. Via the form-fit connection, the first bearing element 46 is preferably removably connected to the base side 20 of the housing 12. The first bearing element 46 is firmly connected to the base side 20 of the housing 12 via screw connections. Preferably the first bearing element 46 has two through holes 48, 50, through which respectively one screw element is guided for a fixation to the base side 20, For a fixation of the first bearing element 46 via the screw elements, threaded bores are introduced in the base side 20 of the housing 12.

The first bearing element 46 is embodied as a bearing rail. The first bearing element 46 that is embodied as a bearing rail forms the straight bearing axis 42. The bearing element 46 that is embodied as a bearing rail has in its side regions respectively one undercut 52, 54. The undercuts 52, 54 are implemented substantially U-shaped. The undercuts 52, 54 are configured so as to enable a form-fit engagement of an element that is to be supported.

The bearing unit 40 comprises a second bearing element 56. The second bearing element 56 is embodied as a bearing carriage. The second bearing element 56 that is embodied as a bearing carriage is configured to be arranged displaceably in the first bearing element 46 that is embodied as a bearing rail. The second bearing element 56 that is embodied as a bearing carriage is supported, displaceably via a slide bearing, in the bearing element 46 that is embodied as a bearing rail. The second bearing element 56 comprises a base body 58. The base body 58 is implemented by a substantially rectangular element. The second bearing element 56 comprises two bearing regions 60, 62. The bearing regions 60, 62 are configured for a support in the bearing element 46 that is embodied as a bearing rail. The bearing regions 60, 62 are configured in each case to engage in one of the undercuts 52, 54 of the bearing element 46 that is embodied as a bearing rail. The bearing regions 60, 62 are arranged on an underside 68 of the base body 58. The bearing regions 60, 62 are realized by webs 64, 66. The bearing regions 60, 62 are realized by L-shaped webs 64, 66. The webs 64, 66 are connected on the underside 68 of the base body 58. The L-shaped webs 64, 66 extend from the underside 68 of the base body 58 first downwards and then outwards. The L-shaped webs 64, 66 extend sidewise along the base body 58. The L-shaped webs 64, 66 extend sidewise in a main extension direction of the base body 58 of the second bearing element 56. The L-shaped webs 64, 66 extend sideways in the main extension direction of the base body 58, preferably over a substantial length of the base body 58. The L-shaped webs 64, 66 are implemented integrally with the base body 58. The base body 58 is implemented together with the L-shaped webs 64, 66 as an injection-molded part.

The second bearing element 56 is firmly connected to the neck support unit 34. For a connection to the second bearing element 56, the neck support unit 34 comprises a base sheathing 70. The base sheathing 70 is configured to be coupled with the second bearing element 56. The base sheathing 70 is embodied as a shaped base plate. The base sheathing 70 forms a construction base of the neck support unit 34. The base sheathing 70 preferably forms a base structure for the neck support element 36 of the neck support unit 34. The neck support element 36 is firmly connected to the base sheathing 70. The neck support element 36 is firmly connected on an upper side of the base sheathing 70. The neck support element 36 is firmly connected to the base sheathing 70 by substance-to-substance bond, in particular via an adhesive connection. Principally it would also be conceivable that the base sheathing 70 is connected to the neck support element 36 via a force-fit and/or form-fit connection. The base sheathing 70 has on its underside a receiving region 100 for the second bearing element 56. The base sheathing 70 is configured to at least partially engage around the base body 58 of the second bearing element 56. The base sheathing 70 is connected to the second bearing element 56 via the receiving region 100. The base sheathing 70 is connected to the base body 56 of the second bearing element 56 via the receiving region 100 in a loss-proof manner. The base sheathing 70 is connected to the base body 58 of the second bearing element 56 by a form-fit connection. As a result, the base sheathing 70 is connected to the base body 58 of the second bearing element 56 preferably in such a way that it is non-destructively demountable. The base sheathing 70 has latch recesses 72, 74 in side regions of the receiving region 100. The base body 58 of the second bearing element 56 has on its side walls latch hooks 76, 78, which are in each case implemented correspondingly to the latch recesses 72, 74. For a form-fit connection of the base sheathing 70 to the base body 58 of the second bearing element 56, the latch hooks 76, 78 are configured for a form-fit engagement into the latch recesses 72, 74. Principally it would also be conceivable that the base sheathing 70 of the neck support unit 34 is connected to the base body 58 of the second bearing element 56 in a different manner, for example via an adhesive connection. The neck support element 36 of the neck support unit 34 is connected to the second bearing element 56. The neck support element 36 is firmly connected to the base body 58 of the second bearing element 56 via the base sheathing 70.

Via the two bearing elements 46, 56 a displaceable support of the neck support element 36 is enabled in the receiving region 18 of the housing 12. The neck support element 36 is adjustable between a minimum position and a maximum position by means of the bearing elements 46, 56. In the minimum position (see FIG. 4), the neck support element 36 has a minimum distance from a lower end of the body region 22 of the housing 12. In the maximum position (see FIG. 3), the neck support element 36 has a maximum distance from the lower end of the body region 22 of the housing 12. The neck support element 34 is adjustable between the minimum position and the maximum position by the bearing distance X.

The bearing unit 40 comprises a blocking device 80. The blocking device 80 is configured for a blocking of the bearing unit 40, i.e. for a locking of the bearing unit 40. The blocking device 80 is configured for a blocking of the bearing unit 40 in the minimum position, in the maximum position and in intermediate positions which are situated in-between. The blocking device 80 is configured to block the bearing elements 46, 56 of the bearing unit 40 in different positions relative to each other. The blocking device 80 is configured to block the bearing elements 46, 56 of the bearing unit 40 in the maximum position, in the minimum position and in positions which are situated between the maximum position and the minimum position.

The blocking device 80 comprises a first blocking element 82, which is connected to the first bearing element 46. The blocking device 80 comprises a further first blocking element 84, which is also connected to the first bearing element 46. Principally it would also be conceivable that the blocking device 80 comprises only one first blocking element 82, 84. The first blocking elements 82, 84 are implemented integrally with the first bearing element 46 that is embodied as a bearing rail. The blocking elements 82, 84 are in each case arranged on an inner wall of the bearing element 46 that is embodied as a bearing rail, above the respective U-shaped undercut 52, 54. The blocking elements 82, 84 in each case have a toothing 114, 116. The toothings 114, 116 are in each case introduced at the inner wall of the bearing element 46 that is embodied as a bearing rail, above the respective U-shaped undercut 52, 54, The toothings 114, 116 extend over an entire length of the first bearing element 46.

The blocking device 80 comprises a second blocking element 86, which is connected to the second bearing element 56. The blocking device 80 comprises a further second blocking element 88, which is also connected to the second bearing element 56. Principally it would also be conceivable that the blocking device 80 comprises only one second blocking element 86, 88. The second blocking elements 86, 88 are connected to the base body 58 of the second bearing element 56. The second blocking elements 86, 88 are coupled in a displaceable manner with the base body 58 of the second bearing element 56. The base body 58 of the bearing element 56 comprises a receptacle 102, in which the blocking elements 86, 88 are arranged and supported in a displaceable manner. The receptacle 102 is arranged centrally in the longitudinal direction of the base body 58. However, an off-center arrangement of the receptacle 102 would also be conceivable. The receptacle 102 is embodied as a receiving recess. The receptacle 102 that is embodied as a receiving recess extends continuously in a transverse direction. The receptacle 102 that is embodied as a receiving recess extends from a side surface of the base body 58 to an opposite-situated side surface. The receptacle 102 that is embodied as a receiving recess extends from an upper side of the base body 58 as far as a level of the bearing regions 60, 62. Principally it is also conceivable that the receptacle 102 that is embodied as a receiving recess is implemented continuously in a vertical direction as well, thus dividing the base body 58 into two separate portions. Per each second blocking element 86, 88 two guiding recesses 104, 106 are arranged on longitudinal walls of the receptacle 102. The second blocking elements 86, 88 in each case have two guiding elevations 108, 110, which are in a mounted state arranged in the guiding recesses 104, 106 of the base body 58. The blocking elements 86, 88 are in each case supported by the guiding elevations 108, 110 so as to be displaceable in the base body 58. The blocking elements 86, 88 are supported in the base body 58 movably in a transverse direction. The blocking elements 86, 88 are supported in the base body movably relative to each other. The blocking device 80 comprises a bearing pin 98, via which the blocking elements 86, 88 are supported so as to be guided relative to each other. The bearing pin 98 is firmly connected to the one second blocking element 88. Preferably the bearing pin 98 is injection-molded into the one second blocking element 88. The other second blocking element 86 comprises a bearing bushing 112, which is configured such that the bearing pin 98 engages therein for a guiding of the blocking elements 86, 88 relative to each other. The bearing bushing 112 is firmly connected to the one second blocking element 86. The bearing bushing 112 is preferably injection-molded into the one second blocking element 86.

The second blocking elements 86, 88 in each case have a toothing 118, 120. The toothings 118, 120 of the second blocking elements 86, 88 are implemented correspondingly to the toothings 114, 116 of the first blocking elements 82, 84. For a blocking of the blocking device 80, the toothings 118, 120 of the second blocking elements 86, 88 are configured to engage into toothings 114, 116 of the first blocking elements 82, 84 in a form-fit manner. The toothings 118, 120 of the second blocking elements 86, 88 are arranged on sides facing towards the toothings 114, 116 of the first blocking elements 82, 84, on elevations which are arranged on an underside of the blocking elements 86, 88. In a mounted state, the toothings 118, 120 of the second blocking elements 86, 88 are arranged so as to be congruent with the toothings 114, 116 of the first blocking elements 82, 84. In a blocking position of the blocking device 80, the toothings 118, 120 of the second blocking elements 86, 88 engage into the toothings 114, 116 of the first blocking elements 82, 84 in a form-fit manner. In the blocking position, the second blocking elements 86, 88 are in an outer position and have been moved away from each other. In a release position of the blocking device 80, the toothings 118, 120 of the second blocking elements 86, 88 do not engage into the toothings 114, 116 of the first blocking elements 82, 84. In the release position, the toothings 118, 120 of the second blocking elements 86, 88 have been moved out of a form-fit engagement with the toothings 114, 116 of the first blocking elements 82, 84. In the release position, the second blocking elements 86, 88 are in an inner position and have been moved toward each other. Principally it would also be conceivable that the first blocking elements 82, 84 in each case have a friction surface instead of the toothings 114, 116, and the second blocking elements 86, 88 in each case have a corresponding friction surface instead of the toothings 118, 120. The blocking device 80 is lockable via a friction-fit brought about by the friction surfaces of the first and second blocking elements 82, 84, 86, 88. In particular by pressing the friction surfaces of the first blocking elements 82, 84 to the friction surfaces of the second blocking elements 86, 88 an advantageous friction-fit is achievable.

The blocking device comprises a spring element 90. The spring element 90 is configured to press the first and second blocking elements 82, 84, 86, 88 into a blocking position. The spring element 90 is configured to press the second blocking elements 86, 88 into the corresponding first blocking elements 82, 84, The spring element 90 is configured to press the respective toothings 118, 120 of the second blocking elements 86, 88 into a form-fit connection with the respective toothing 114, 116 of the first blocking elements 82, 84. The spring element 90 is configured to press the second blocking elements 86, 88 into their blocking position. If there is no further force acting onto the blocking elements 86, 88 from outside, the blocking device 80 is automatically pressed into the locking position by the spring element 90. The spring element 90 is embodied as a compression spring. The spring element 90 is in particular embodied as a helical spring. The spring element 90 is arranged between the two second blocking elements 86, 88. The spring element 90 is put onto the bearing pin 98. The spring element 90 is configured to apply a force to the second blocking elements 86, 88, which presses the second blocking elements 86, 88 outwards and away from each other.

The blocking device 80 comprises an actuation mechanism 92, by means of which the blocking device 80 is adjustable between its blocking position and its release position. The actuation mechanism 92 comprises two actuation members 94, 96, which are in each case implemented together with one of the second blocking elements 86, 88. The actuation members 94, 96 are embodied as pressure elements, which can be gripped and pressed manually by an operator. The actuation members 94, 96 are implemented integrally with the respective blocking element 86, 88. The actuation members 94, 96 are implemented as elevations which are integrally molded to the respective blocking element 86, 88. The actuation mechanism 92 comprises a spring element, against whose spring force the actuation members 94, 96 are deflectable. The spring element of the actuation mechanism 92 is implemented integrally with the spring element 90 of the blocking device 80. The spring element of the actuation mechanism 92 is implemented by the spring element 90 of the blocking device 80.

The invention claimed is:

1. An instrument case for receiving a string instrument, with a housing, with a receiving region, delimited by the housing, for receiving an instrument and with at least one neck support module comprising a neck support unit for supporting an instrument neck, the housing includes a base side configured and adapted to face a bottom of a body of the instrument received in the receiving region, wherein the neck support module comprises a bearing unit having two bearing elements and supporting the neck support unit in the receiving region in an adjustable manner, the two bearing elements include a first bearing element firmly connected directly to the base side of the housing, the first bearing element is embodied as a bearing rail and is firmly connected directly to the base side of the housing, and the two bearing elements include a second bearing element, the second bearing element is embodied as a bearing carriage and is connected to the neck support unit, wherein the bearing carriage comprises two bearing regions configured by webs, which are configured to engage into and allow movement along two undercuts formed by the first bearing element that is embodied as the bearing rail.

2. The instrument case according to claim 1, wherein the bearing unit is embodied as a linear bearing unit.

3. The instrument case according to claim 1, wherein the bearing unit comprises a blocking device, which is configured for a blocking of the bearing elements of the bearing unit in different positions.

4. The instrument case according to claim 1, wherein the bearing unit comprises a blocking device, which is configured for a blocking of the bearing elements of the bearing unit in different positions and wherein the blocking device comprises at least one first blocking element, which is connected to the first bearing element, and at least one second blocking element, which is connected to the second bearing element and is implemented correspondingly.

5. The instrument case according to claim 4, wherein the first blocking element comprises a toothing and that the second blocking element comprises a corresponding toothing, which engage into each other in a form-fit manner for a blocking.

6. The instrument case at least according to claim 3, wherein the blocking device comprises a spring element, which is configured to press the first and second blocking elements into a blocking position.

7. The instrument case at least according to claim 3, wherein the blocking device comprises an actuation mechanism, by means of which the blocking device is manually adjustable between a blocking position and a release position.

8. The instrument case according to claim 4, wherein the blocking device comprises an actuation mechanism, by means of which the blocking device is manually adjustable between a blocking position and a release position and wherein the actuation mechanism comprises at least one actuation member, which is connected to the at least one second blocking element, and a spring element, against whose spring force the actuation member is deflectable.

9. The instrument case according to claim 8, wherein the blocking device comprises a spring element, which is configured to press the first and second blocking elements into a blocking position, the spring element of the blocking device and the spring element of the actuation mechanism are implemented integrally with each other.

10. A neck support module for an instrument case for receiving a string instrument, the instrument case having a housing with a receiving region delimited by the housing, for receiving an instrument, the housing includes a base side adapted to face a bottom of a body of the instrument received in the receiving region, the neck support module comprising:

a neck support unit for supporting an instrument neck of the instrument, and a bearing unit having two bearing elements and supporting the neck support unit in the receiving region in an adjustable manner, the two bearing elements include a first bearing element configured and adapted to be firmly connected directly to the base side of the housing, the first bearing element is embodied as a bearing rail and is firmly connected directly to the base side of the housing, and the two bearing elements include a second bearing element, the second bearing element is embodied as a bearing carriage and is connected to the neck support unit, wherein the bearing carriage comprises two bearing regions configured by webs, which are configured to engage into and allow movement along two undercuts formed by the first bearing element that is embodied as the bearing rail.

11. The instrument case according to claim 1, wherein the neck support module forms a neck support surface that forms a concave contour configured and adapted to correspond to a negative contour of the instrument neck of the string instrument.

12. The instrument case according to claim 1, wherein the first bearing element has two through holes through which respectively one screw element is guided for a fixation to the base side via threaded bores in the base side.

13. The instrument case according to claim 1, wherein the first bearing element configured as the bearing rail includes opposing side regions, each of the side regions having respectively one of the two undercuts configured and adapted for a form-fit engagement of the neck support unit.

14. The instrument case according to claim 1, wherein the first bearing element is configured and adapted to be directly connected to the base side of the housing vertically below the instrument neck.

15. The neck support module according to claim 10, wherein the neck support module forms a neck support surface that forms a concave contour adapted to correspond to a negative contour of the instrument neck of the string instrument.

16. The neck support module according to claim 10, wherein the first bearing element has two through holes through which respectively one screw element is guided for a fixation to the base side via threaded bores in the base side.

17. The neck support module according to claim 10, wherein the first bearing element is configured and adapted to be directly connected to the base side of the housing vertically below the instrument neck.

18. The instrument case according to claim 1, wherein the bearing unit is aligned parallel to a central axis of the housing.

19. The instrument case according to claim 8, wherein the actuation member is embodied as a spring-loaded push button, which is configured to be deflected from its neutral position into its actuation position by application of a pressure force.

20. The instrument case according to claim 8, wherein the blocking device comprises a spring element, which is configured to press the at least one first blocking element and the at least one second blocking element into the blocking position, wherein the spring element of the blocking device and the spring element of the actuation mechanism are realized by the same spring element.

* * * * *